US008670354B2

(12) United States Patent
Lohmar et al.

(10) Patent No.: US 8,670,354 B2
(45) Date of Patent: Mar. 11, 2014

(54) SHARING ONGOING DATA SESSION

(75) Inventors: Thorsten Lohmar, Aachen (DE); Frank Hundscheidt, Kerkrade (NL); Ralf Keller, Würselen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1113 days.

(21) Appl. No.: 11/574,903

(22) PCT Filed: Sep. 8, 2004

(86) PCT No.: PCT/EP2004/009994
§ 371 (c)(1),
(2), (4) Date: Dec. 27, 2007

(87) PCT Pub. No.: WO2006/027006
PCT Pub. Date: Mar. 16, 2006

(65) Prior Publication Data
US 2008/0239996 A1    Oct. 2, 2008

(51) Int. Cl.
*H04L 12/16* (2006.01)
*H04M 3/51* (2006.01)

(52) U.S. Cl.
CPC ..................................... *H04M 3/51* (2013.01)
USPC ........... 370/270; 370/259; 370/260; 370/261; 370/262; 370/265; 370/266; 370/267; 370/312; 370/390; 370/396; 370/432; 709/231; 709/232; 709/244

(58) Field of Classification Search
None
See application file for complete search history.

(56) References Cited

U.S. PATENT DOCUMENTS

| 6,411,616 | B1 * | 6/2002 | Donahue et al. | 370/352 |
| 7,412,531 | B1 * | 8/2008 | Lango et al. | 709/231 |
| 7,743,263 | B2 * | 6/2010 | Dalton et al. | 370/352 |
| 7,958,254 | B2 * | 6/2011 | Hundscheidt et al. | 709/232 |
| 2004/0057449 | A1 * | 3/2004 | Black | 370/432 |
| 2004/0120474 | A1 * | 6/2004 | Lopponen et al. | 379/88.17 |
| 2006/0046758 | A1 * | 3/2006 | Emami-Nouri et al. | 455/518 |
| 2006/0155839 | A1 | 7/2006 | Hundscheidt et al. | |

OTHER PUBLICATIONS

A framework for conferencing with the session initiation protocol, Rosenberg, published Feb. 2003.*
J. Rosenberg: "A Framework for Conferencing with the Session Initiation Protocol" Internet Engineering Task Force Internet Draft, 'Online! Feb. 12, 2004, pp. 1-39 XP002306594 Retrieved from the Internet: URL:http://www.watersprings.org/pub/id/draft-rosenberg-sipping-conferencing-framework-01.txt> retrieved on Nov. 19, 2004.

(Continued)

*Primary Examiner* — Faruk Hamza
*Assistant Examiner* — Aixa A Guadalupe-Cruz (57) ABSTRACT

The present invention discloses a solution for performing a sharing an ongoing data session between a first user and a group of at least one additional user in a telecommunication system. The basic idea of this invention is to provide a network integration node with a shared streaming session logic, replication logic and group membership management functions of a conference node, like for example the "Push to-talk over Cellular (PoC)" application. Using this functionality the conference system is to be included into the ongoing streaming session, shall invite additional members and forward the streaming traffic to them as well. This results into a shared streaming service using unicast communication resources.

16 Claims, 5 Drawing Sheets

(56) References Cited

OTHER PUBLICATIONS

3GPP: "Conferencing using the IP Multimedia (IM) Core Network (CN)" 3GPP TS 24.147 V1.2.0, 'Online! Aug. 2004, pp. 1-27, XP002306595 Valbonne France Retrieved from the Internet: URL:http://www.3gpp.org/ftp/Specs/archive/24_series/24.147/24147-120.zip> retrieved on Nov. 19, 2004.

Ericsson, et al: "Push-to-talk over Cellular (POC); Architecture; PoC Release 1.0". Architecture v1.1.0 (Aug. 2003).

Ericsson, et al: "Push to Talk over Cellular (PoC); List Management and Do-Not-Disturb; PoC Release 1.0". List Management and Do-Not-Disturb v1.1.3 (Aug. 2003).

\* cited by examiner

SHARING ONGOING DATA SESSION

TECHNICAL FIELD OF THE INVENTION

The present invention relates to a method, a network integration node and a system for performing sharing of an ongoing data session with a group of at least one additional user in telecommunications network.

In particular, the present invention might be applied for sharing of streaming session as an example of data session.

The UMTS (Universal Mobile Telecommunication System) as a third-generation 3G mobile communication applies streaming to provide high-quality content to the users. Images, voice, audio and video content are examples of mobile multimedia services, which are delivered to the users via streaming. The multimedia data is distributed by means of multimedia protocols. An example of such multimedia protocol is Real-time Transport Protocol RTP. The RTP provides end-to-end network transport functions suitable for applications transmitting real-time data, such as audio, video or simulation data, over multicast or unicast network services. The RTP contains a related control protocol RTCP augmenting the data transport, which is used to monitor the QoS and to convey information about the participants in an ongoing session. Each media stream in a conference is transmitted as a separate RTP session with a separate RTCP stream. Furthermore there is also Real-Time Streaming Protocol RTSP providing session control for streaming sessions, in particular it is used to establish and control a packet switched streaming (PSS) session. RTSP allows the set-up of individual streaming sessions using unicast IP addresses. Hereby a user establishes the RTSP control session via a streaming proxy to the streaming server. The actual user plane resources (which are source and destination IP (unicast) addresses and RTP and RTCP port numbers) are negotiated during the RTSP set-up phase.

In the cellular environment, the RTSP streaming control session is typically proxied in some kind of Network Integration Node (NiN). One main intention of the NiN is to create charging records, but also other functions are implemented. However, the most important functionality is the proxying of data session being exchange between a user and a server.

A number of applications in current telecommunication systems, such as the UMTS or any high-speed network such as asynchronous transfer mode networks, are one-to-many applications, where one or a few sources are sending to many receivers. Streaming application, as described beforehand, can be realized as the one-to-many application. One possible application is sharing of streaming services among a number of users, for example in case of the so-called party-streaming, wherein a user sends streaming flow to a number of users.

The simplest way for realization of one-to-many transmission is the establishment of a number of point-to-point connections, also called unicast connections, from a sending party (which can be also a proxy of the sending party, for example NIN) to each of the receiver. In case of streaming session using RTP as end-to-end transport protocol the unicast transmission is used to distribute the real-time applications, such as audio, video or simulation data, among the receivers.

Alternatively, an efficient way to support one-to-many streaming application is to use multicasting for the transmission. Multicasting is an internetwork service that permits sources to send a single copy of a data packet by means of a special multicast address, like for example IP-multicast address, that causes the data packet to be delivered to multiple receivers. Thus, under multicasting only one copy of a message will pass over any link in the network and copies of data packets will be done only where paths diverge. In case of the multicast transmission, the network connections are reserved for a number of users.

Moreover, in the current telecommunication systems there are one-to-many services enabling speech conferencing between users. An example for such kind of services is the Push-to-Talk over Cellular (PoC) service, which is characterized by a half duplex form of communication whereby one user communicates with other users by pressing a button on an PoC enabled User Equipment (UE). For the establishment of a PoC session the Session Initiation Protocol SIP is used. The transmission of voice data is performed by means of the RTP/RTCP protocol, which is used between a PoC server and the users. Furthermore in 3GPP a term IP-Multimedia System IMS is used for SIP, wherein IMS uses SIP intermediate nodes like for example between SIP proxies. In this connection it is to be mentioned that PoC system uses IMS for the above-mentioned kind of signaling.

The PoC server being part of PoC architecture is responsible for provision of the PoC service. This includes for example termination of signaling for establishment and providing a session (like for example SIP or RTP/RTCP signaling). One of the major features of the PoC service is the management of groups including users wanting to talk with each other. The end user can define PoC groups and said end user may select one group from a contact list, which is a kind of address book that may be used by PoC users to establish an instant talk session with other PoC users or PoC groups. The user might initiate a group talk session or a chat group talk session with the selected group. The initiation of the talk session is made by means of SIP protocol and the real data transfer by means of RTP/RTCP. The PoC server is responsible for group session handling. However this service concentrates only on talk sessions and a user has to establish such conference in advance, because it is not possible to change to a multiparty conference during an ongoing one-to-one conference.

It is also to be noticed that the PoC architecture represents only one possible way for technical realization of a conference between users in a telecommunication system.

As beforehand described in the current existing solutions a streaming based on RTSP refers to individual session set-up using unicast IP transmission. The RTSP protocol also allows to set-up session, which transmits the content with an IP Multicast Group Address. Here, an user still uses an individual RTSP control connection to specify the use of an IP Multicast Group as user plane resources. However the user needs to determine the use of IP Multicast resources at the beginning of each session. Thus, RTSP does not allow the transition from unicast resources (using IP Unicast addresses) to multicast resources (using IP Multicast) during an ongoing session. This means, that IP Multicast can be used for shared streaming sessions, but an ongoing unicast session needs to be released and re-established using multicast resources. Furthermore, a network needs to support multicast resource usage like currently specified via Multimedia Broadcast Multicast Service MBMS. If the system does not support the use of IP Multicast addresses, then the provision of a shared streaming session is not possible. Furthermore, operators may want to provide a differentiated charging scheme. Hence also a low-cost delivery solution is required combined with the possibility to use different charging approaches.

It is to be noted that streaming session is being used as preferred embodiment, but the described problem of sharing of data session during an ongoing transmission occurs for any kind of data session.

SUMMARY AND DESCRIPTION OF THE INVENTION

Therefore, it is an object of the present invention to provide a solution for sharing data session among a number of users during an ongoing data session between a user and a data server within a telecommunication network.

The present invention discloses a method for sharing data session between a first user and a group of additional users in a telecommunication system. It is to be emphasized that the group of additional users might include zero, one or more users. Said system has a network integration node for data session proxying and a server for providing the data session to the first user. Said method is to be performed in the network integration node and comprises the following steps. First a data session proxying procedure is performed to track the data session being established by the first user. In the next step the first user decides to share the ongoing data session with additional users. Hence, the intermediate node receives a request from the first user for sharing the data session. Said request might include a group identifier of the group of the additional users. It is to be noted that the group identifier might be also a single address in case the data session is to be shared with one additional user.

Subsequently a conference establishment procedure to a conference node handling additional users for binding the network integration entity to the conference node as a conference party of a conference is performed. As a result a second data session from the network integration node to the conference node is established. For this purpose the intermediate node might send signalling to the conference node to trigger a conference invitation procedure for inviting the group of additional users to the conference. Said signalling to the conference node might include the group identifier of the group that is to be invited. For the purpose of inviting the group the conference node might use the already existing methods. Hereby it is to be emphasized that the invitation procedure for inviting additional users of the group of additional users might be performed by the conference node either as a subsequent step or it might be also carried out at a later stage. For the intermediate node it is not important when it takes place since for said intermediate node the conference node is like a user to whom data is to be sent. The intermediate node performs a replication procedure (S24) for triggering a replication of the streaming session to the group of the additional users, wherein data session is sent to the conference node using the second data session connection. The replication procedure might include a replication of the data session between the conference node and the first user or the data session is merely forwarded to the conference node, which performs a replication among all users, inclusive the first user. Independent where the replication is performed, the conference node performs the final replication to the users of a given group, wherein the group may contain zero, one or more users. Said final replication might be also performed by means of multicast transmission capabilities.

Furthermore the present invention discloses a network integration node adapted to perform a sharing of an ongoing data session between a first user and a group of at least one additional user wherein said network integration node is located in a telecommunication system. Said network integration node comprises proxy logic for proxying a data session provided by a server to the first user. Said logic has the parameters of the ongoing data session being transmitted between a server providing the data session and the first user. A reception controller for receiving and evaluating a request from the first user indicating with the request the wiliness to share the ongoing data session with the group of at least one additional user is a further part of the network integration node. Further the network integration node has a binding controller for binding the network integration entity as a conference party of a conference to a conference node handling the group of the at least one additional user. Said binding controller is adapted to establish a second data session connection to the conference node. Replication logic is responsible for triggering a replication of the data session to the group of at least one additional user wherein the second data session connection (18) is used to transmit data session to the conference node.

Further it is proposed that the reception controller has logic for evaluating a group identifier included in the request received from the first user. Said group identifier is used in a communication with the conference node.

Furthermore the present invention discloses a system adapted to perform a sharing of an ongoing data session between a first user and a group of at least one additional user wherein said system is located in a telecommunication system and comprises a network integration node communicating with a conference system providing conference service to a group of users and with a first user being adapted to sent a request to the network integration node for sharing the ongoing data session with the group of at least one user wherein the communication is performed.

Hence, the basic idea of this invention is to provide a network integration node with a shared streaming session logic and realizing a shared streaming session using unicast network components. The network integration node might be either a node developed with the above-mentioned functions or an existing network integration node with proxing functionality might be enhanced with the functionality for realizing a shared streaming session.

The present invention shall enable the network integration node to use an advanced replication engine and group membership management functions of a conference node, like for example the "Push-to-talk over Cellular (PoC)" application. Using this functionality the conference system shall be included into the ongoing streaming session, shall invite additional members and forward the streaming traffic to them as well. This results in a shared streaming service using unicast communication resources.

In the following preferred examples of the present invention shall be described in detail, in order to provide the skilled person with thorough and complete understanding of the invention, but these detailed embodiments only serve as examples of the invention and are not intended to be limiting. The following description shall make reference to the enclosed drawings, in which.

Although the following preferred embodiments of the present invention will often refer to systems using Network Integration Node NIN as network integrated node and Push-To-Talk System (PoC) as a conferencing system, the present invention is neither restricted to NIN nor to PoC. The present invention can be applied to any type of telecommunication system, in which a communication link can be established between a network integration node being responsible for a data session and a conference system being able to invite users to a system providing communication to a number of users.

It should be noted that the terms "entity", "node", "user", "server" in the context of the present invention refers to any suitable combination of hardware and software for providing a predetermined functionality in the communication network. In this way, said terms generally refers to a logical entity that can be spread out over several physical nodes of the network, but can also refer to a physical entity located in one physical node.

In the examples described thereafter the function of a user and a server are physically separated. However, said function might be connected in such manner that the user provides the session data, providing in this way functionality of a server.

Furthermore, preferably the prime use case of this invention is, that a first user invites additional users into the data session. It is to be noticed that the first user is not necessarily a mobile and its user, but also a fixed server with a predetermined schedule can fulfil the function of a first user and invite users to a group for sharing a data session.

Preferably, the communication network is a mobile communication network, for example operating according to GPRS (General Packet Switched Radio) or UMTS(Universal Mobile Telephone System) or GSM. However, the present invention is also applicable in any communication network providing communication among a number of users.

Moreover it should be noted that the term "data session" designates any kind of data session, which is to be shared by a number of users. In the embodiments described thereafter streaming session is used preferably. However the present invention is not restricted to the streaming transmission.

Figure 1:
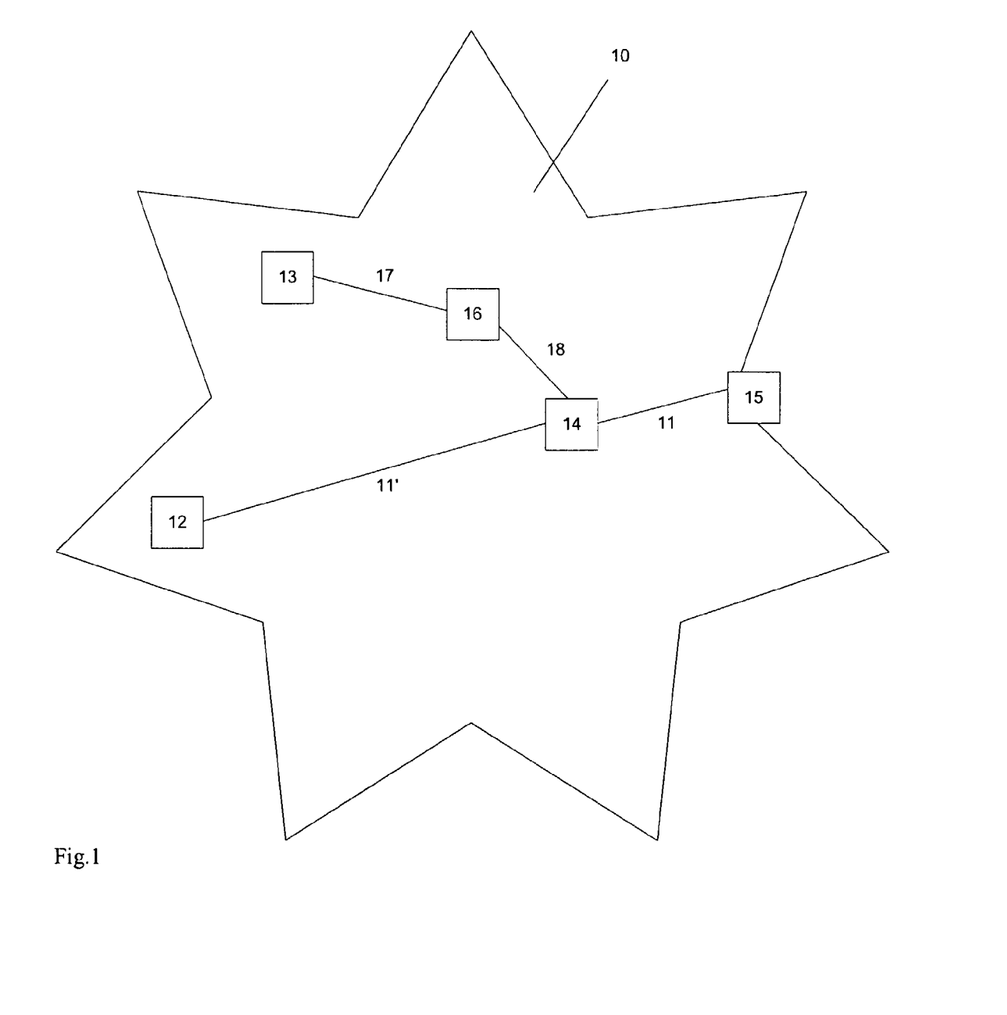
FIG. 1 shows schematically a telecommunication network providing data session.

FIG. 1 shows a schematic representation of a telecommunication system 10 according to an embodiment of the present invention.

The telecommunication system 10 includes two users, a first user 12 and an additional user 13. The first user establishes a connection 11' and 11 via a network integration node 14 to the server 15. The responsibility of the network integration node 14 is to track the established connection, like for example to track the assigned relations between the users and the corresponding transmissions. In case the first user 12 decides to share the ongoing data session with the additional user 13, a corresponding request is sent over the connection 11' to the network integration node 14. In the subsequent step the network integration node establishes a connection 18 to a conference node 16. The connection 18 is a unicast data session being established to the conference node to forward the replicated data packets to the conference node. Upon establishing the connection 18, the conference node initiates an invitation procedure for inviting a group including one additional user 13 to the conference so that a communication can be performed on an established second data session 17. It is to be noted that the additional users might be added later to the group, for example in case the users are initially not known to the conference system, then they are invited at a later stage as soon as the system has their identity. This means this invitation on link 17 is performed independently on performing the communication on the connection 18.

Figure 2:
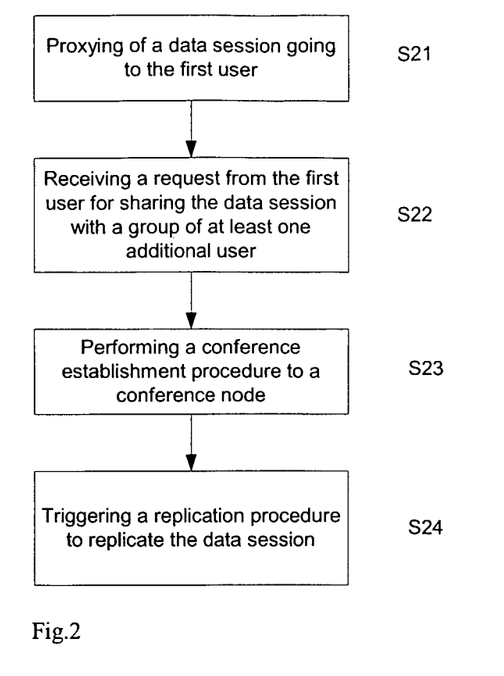
FIG. 2 shows a flowchart of a basic embodiment of the present invention.

In the following a basic embodiment of the present invention in respect to FIG. 2 is presented.

FIG. 2 shows a flowchart of the basic embodiment of the present invention with steps being carried out in the network integration entity.

The basic method proceeds on the assumption, that a data session is established between a first user and a server, wherein said data session goes through a network integration node being responsible for tracking an established data session, like for example for tracking assigned relations between the users and the corresponding transmissions. This task is performed in the first step S21 of FIG. 2.

Subsequent to step S21, the method of FIG. 2 proceeds to step S22, in which a request from the first user for sharing the ongoing data session with a group of at least one additional user is received. It is to be noted that the group might have zero, one or more users. However, it is likely, that the group consists of at least one additional user.

Preferably the request from the first user includes information on the identity of the group of at least one additional user.

Upon receiving this request a conference establishment procedure to a conference node is started S23. The purpose of said procedure is to bind the network integration entity to the conference node as a conference party of a conference. Said conference establishment procedure comprises exchange of corresponding signalling in order to trigger the conference node to invite the group of at least one additional user to the conference, wherein as mentioned before the invitation of the group might be performed immediately or at a later stage. For the purpose of the invitation of further users, the received group's identity is used. Said group's identity is forwarded to the conference node, which uses it for the establishing access to the users.

The conference establishment procedure results in an establishment of a second data session connection for sending the data session received from the server to the conference node. Said second data session connection is used to transport the session data being received from the server to the conference node, which forwards the session data on the further data session connections established to the users.

Subsequent to step S23, the method of FIG. 2 proceeds to step S24, in which a procedure for triggering a replication of the streaming session is started. Hereby it is to be noted that the replication depends on the number of users in the group. In case the group includes zero users, no replication is performed and the conference node for example discards the received data.

Preferably, the existing nodes, for example the existing NIN, might realize the function of the network integration node. Herein the functionality of NIN is to be enhanced by a replication engine in order to replicate the data session received from the server to one further receiver, which is the conference node in this scenario.

Alternatively the replication might be performed in the conference node. In the last case it is preferably that the connection between the network integration node and the first user is closed down (referring to FIG. 1 it is the connection 11') and an additional connection is established between the conference node and the first user.

Figure 3:
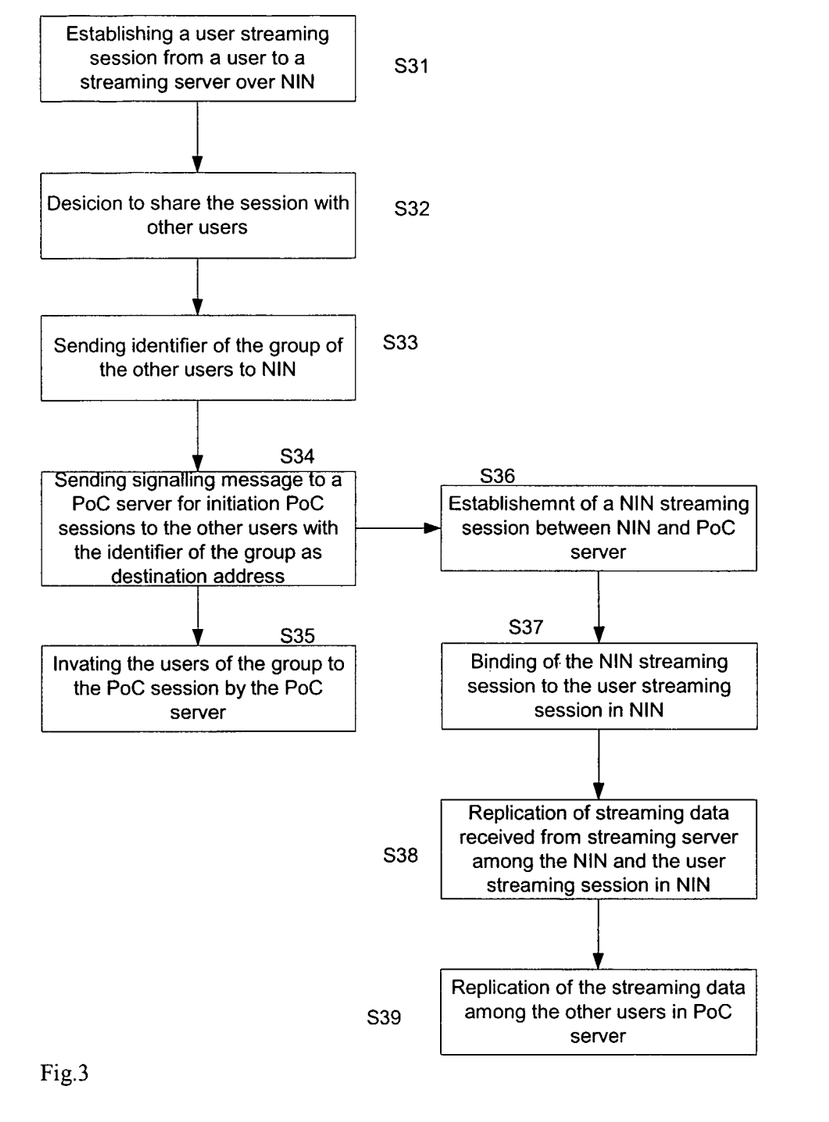
FIG. 3 shows a flowchart of an embodiment of the present invention.

In the following an embodiment of the present invention in respect to a flowchart in FIG. 3 is presented. In particular an embodiment with a scenario for a streaming session is disclosed. NIN performs the task of the network integration node and the PoC server fulfils the requirements of a conference node.

In the first phase of the present invention a connection is established between a streaming user and a streaming server via the NIN, S31. In step S32 decides the user to share the ongoing streaming session with other users and the said first user sends a corresponding request to the NIN. In order to establish an additional connection to the group of additional users the NIN needs to know the identity of the PoC system handling said additional users.

Currently, the invitation of the individual users is handled by the PoC system by using information about a valid group identity. Preferably the inviting user (that one who activates the streaming session) provides the group address, for example by means of a parameter included in a RTSP "SET_PARAMETER" command being transmitted to the NIN, which uses said parameter for the interaction with the PoC system. Said command is an embodiment for realising the request from the first user. Said message might carry different parameters, for example group's identity. Alternatively, there might be an extra http interface from the user to the NIN for triggering the sharing procedure instead of the RTSP-Set-Parameters command. In this case the http command is adapted to carry same parameters as RTSP, in particular the group's address. The NIN regards this new message as trigger to contact the PoC system and to start establishing the shared streaming session.

Hence, the inviting user can use the standard PoC Group lists to specify the members of the shared session, wherein the user can either already have a well managed set of lists and just selects one of the lists, from which all list's members shall participate in the shared streaming session. The first user might retrieve the actual PoC Group List by contacting directly the PoC server via a certain interface. Said interface might be used to manage the group by utilizing the existing group management procedures. The other alternative is, that the inviting user first specifies the members of the shared streaming session. This can be interleaved with the shared streaming session establishment. In this case the PoC server is already involved using a valid group identifier, although the group does not have any members. That means that the invitation procedure between the PoC server and the users is to be performed at a later stage. Alternatively, the list of additional users is created first, before the actual establishment of the shared streaming session is performed and the list is sent during the establishment of the shared session to the NIN, which forwards it subsequently to the PoC server.

Currently, one of the PoC system's functionality is the administration of the user's groups. Thus, the existing PoC system administrates users groups, for example a list of members for the shared streaming session is maintained by means of a special group membership management procedure. Further, a high level protocol might be used for contacting different nodes in order to get users or groups addresses, for example a group management system uses http protocol for the actual group management, wherein basic functions like "create group" or "add member" as well as more sophisticated functions are supported. By means of said http protocol the user might contact the PoC server for managing and receiving an identifier of a group of additional users with which the data session is to be shared.

The lists of users can be addressed using SIP-group addresses, whereby in case of the http protocol these are the SIP-groups urls. The group membership management system can resolve the SIP group url to a list of unicast addresses of the users in case a PoC session is to be established. Each individual member of the list is invited to the conference by means of SIP as a signalling protocol and negotiates a RTP/RTCP session for user plane data delivery used for transmitting of the data session to the users.

Returning to FIG. 3, the first user intending to share the stream with a group sends in subsequent step S33 the group identifier to NIN, which is forwarded to the PoC server. However, first, S34, a signalling message is sent to the PoC server for establishment of a connection to the PoC server, so that the NIN becomes the "initiator" and "speaker" of the PoC session. The NIN uses IMS and sends a SIP message to the PoC server. The SIP message contains the group identifier as destination address. By means of these SIP message exchange, a RTP/RTCP (unicast) data session is established between the NIN and the PoC, S36. The NIN binds this new RTP/RTCP session to the already existing session, S37 and starts packet replication for this session as soon as the negotiation process is finished, S38. In parallel in the present embodiment, the PoC server upon receiving the invitation message starts to invite all users being part of the group, S35. The data being replicated in NIN is sent to the PoC server, which replicates said data amongst the users being part of the established conference, S39.

Alternatively to the above-described embodiment it is proposed that NIN does no replication at all. As soon as the share streaming session is triggered, the PoC server does the replications. In order to realise it, the PoC server is included into the streaming session via additional signalling. The RTP/RTCP session between the NIN and the inviting user is released and re-established via the PoC server.

In other alternative, the NIN replicates data packets, until said data packets reach the first user via the PoC server. Subsequently, the NIN stops replicating packets for the first user and only forwards the RTP packets to the PoC server. Advantage of this alternative is that after some handover time, only the PoC application server does packet replication.

Furthermore it is to be noticed that NIN is not only restricted to create one additional copy, but a number of copies can be created for multiple destinations of which one or several are PoC servers and this can occur when the PoC servers are located in different domains or with different capabilities. The replication could also be to one PoC server and to several receivers that have registered to the streaming server, implying that copies are created to a mix of pre-registered and ad-hoc (these are PoC receivers that are invited at the start of the session) receivers.

Furthermore the NIN can be extended by additional functionality, for example if PoC system and NIN are collocated then the link between PoC and NIN might not be necessary. Further functionality might be that the NIN is responsible for collecting data required for charging of a shared data session.

The charging records for the inviting client including the group can be collected preferably in the NIN. The size of the group can be requested from the Group Management System. In that case, the transmission charging for the invited users can be suppressed. The charging can be adapted to contain the group invitation information. The NIN can also store the inviting user for providing for example a free-of charge service due to the preferably more generated revenue for the operator.

In the following a special functionality of a conference system, namely the floor control according to the present invention is described in more details.

The floor control in context of shared streaming defines the procedure to control the single stream from the content server/NIN to allow also another user instead of the first user to control the source. For the provision of the floor control some special functions need to be implemented in the NIN and/or the PoC server. The content server is able only to understand one RTSP control session; therefore the control commands from other users can be preferably merged in the NIN.

In order to explain individual steps of the present invention, in the following an embodiment is given showing a detailed message sequences in respect to FIGS. 4a-4d.

The common nodes of FIGS. 4a-4d are user A communicating with a server via NIN. In the FIGS. 4b-4d also a PoC server is shown.

Before activating the shared streaming session, the user A needs to activate a standard data session. In respect to FIG. 4a this is done by means of exchanging RTSP based streaming control messages, in step 411 and 412, respectively between the user, A, NIN and the content server, server. Upon establishing the connection a data session, for example streamed video is sent from the server via NIN to the user by means of a unicast connection, 413, 413'. Herein, it is assumed that user A does not know at session establishment time, that he would like to share the stream with additional users.

Figure 4A:
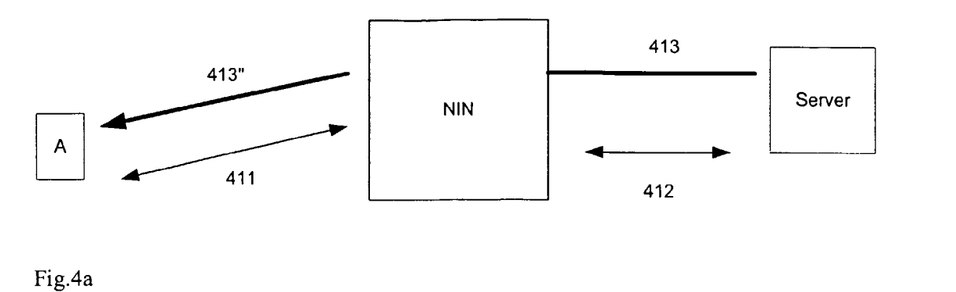
FIG. 4*a*-FIG. 4*d* show message exchange according to an embodiment of the present invention.
Figure 4B:
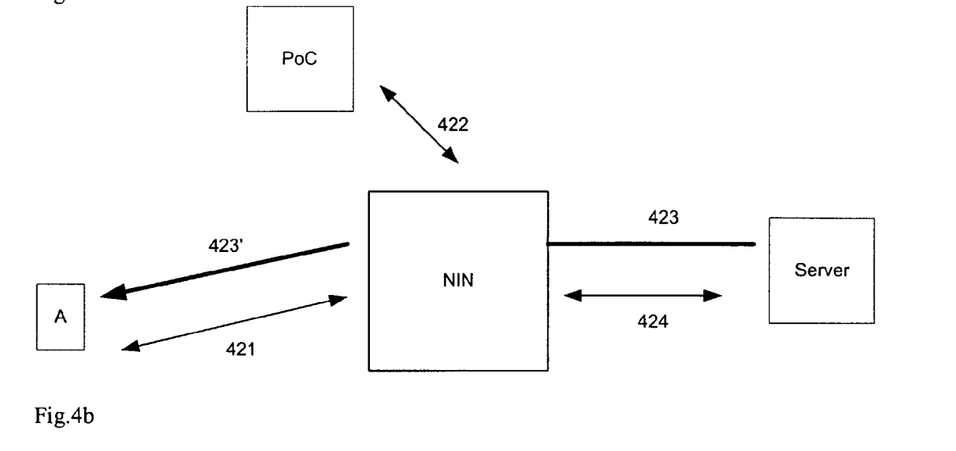

During an ongoing single user data session, user A decides to share the session with other users. The user A uses the standard PoC Group lists to specify the members of the shared session group, wherein the user A can either already have a well managed set of lists of users and just selects one of the lists, from which all members shall participate in the shared streaming session. The other alternative is, that user A first needs to specify the members of the shared streaming session. In a further alternative the list is created first, before the actual establishment of the shared streaming session is carried out. Anyhow, as soon as the user A has a valid group identifier from the PoC system, it activates a Shared Streaming Session using an extended version of the RTSP protocol. This procedure is depicted in FIG. 4b. In the following embodiment the extension is the "SET_PARAMETER" command. In step 421 the user A gives a group identifier and optional also the address of the Poc server with the RTSP command towards the streaming server. The NIN intercepts the command preferably without forwarding it to the streaming server and validates the correctness of the group identifier with the PoC server, 422. Optionally, the NIN or the PoC server authenticates the user, to be generally allowed for the shared streaming session activation. In case, the user is not allowed, the NiN may respond with a negative result report to the user A. With step 423 and 423' it is to be emphasized that the data session's transfer between the user A and the server is maintained during the initiation of the shared streaming session.

Figure 4C:
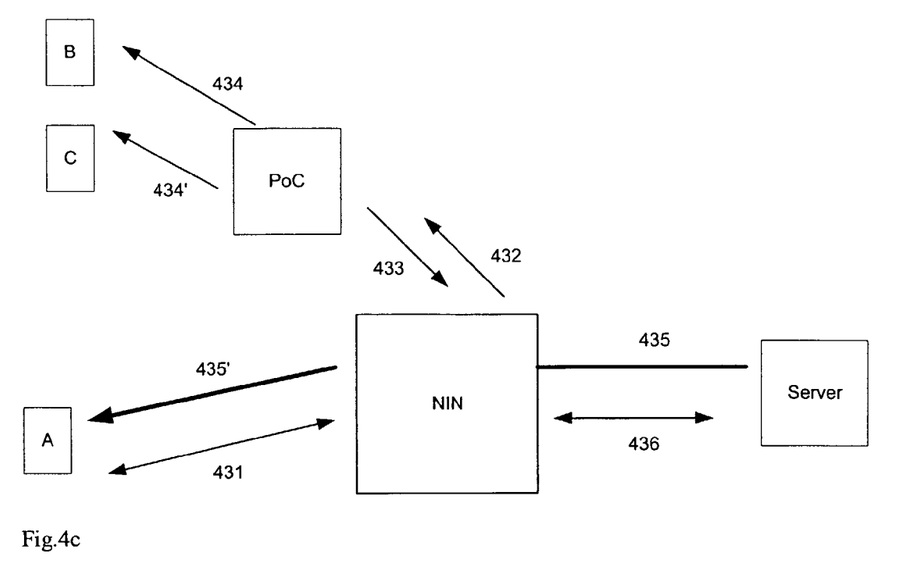

In respect to FIG. 4c, in a subsequent step an establishment of shared streaming session is performed.

As first step of the shared streaming session activation, 431, the NIN needs to become the "initiator" and "speaker" of the PoC session, that means according to the PoC standard that one, who presses the button. For this purpose the NiN uses IMS message being a new function of NiN and sends a SIP message to the PoC server, 432. The SIP message contains the group address as destination address, for example IP Address and Port. With these SIP message exchange, a RTP/RTCP (unicast) session is established between the NIN and the PoC, 432, 433. Upon receiving a SIP message from NIN and as soon as the PoC group List contains any members, the PoC server starts an invitation procedure to the other users. This can be performed by means of sending a SIP invite message to the other users, 434,434'. The purpose of the messages, 435, 435', 436 is to show that the already established data session to the user A is still maintained.

Figure 4D:
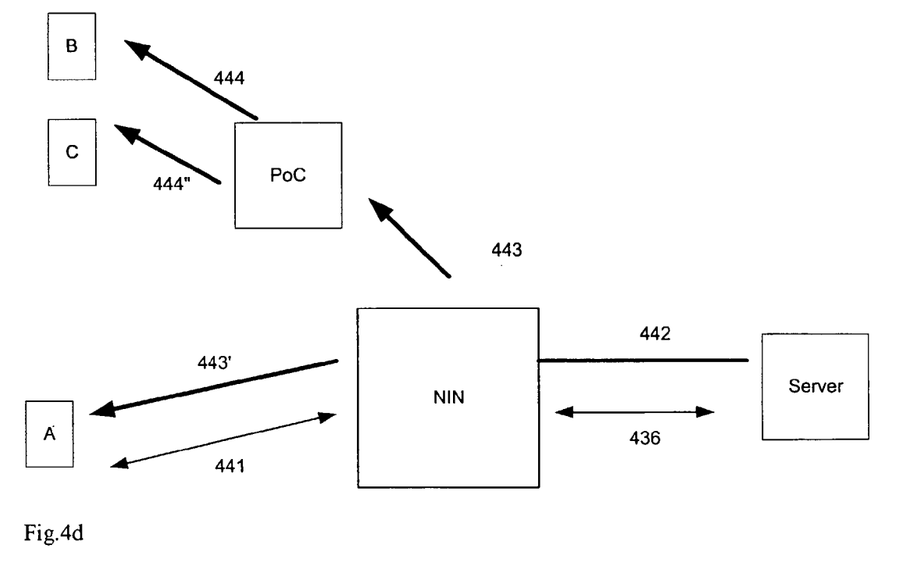

In the next step the replication of the data to the other users is shown. With the establishment of the shared data session by means of the SIP protocol between the NIN and the PoC server it is achieved, that the NIN binds this new RTP/RTCP session to the already existing session and starts packet replication for this session as soon as the negotiation process is finished and on the prerequisite that there are members specified by the group identifier, because if the group is empty the PoC system does not perform any replication. This step is shown in FIG. 4d in step 443 and 443', indicating that the NIN replication function sends one copy of the received data packets to the user A and one to the PoC server. The PoC server upon receiving the data packets distributes the data packets in usual way, as it is performed for conferencing purpose, because after the SIP invitation process, the RTP/RTCP session is allocated to the users B and C and the PoC server can start replicating packets to the attached users.

In a more advanced implementation, the PoC server would also provide an RTSP protocol engine. The purpose of the RTSP server engine is, that the client receives RTSP responses. This is not a full RTSP server implementation with all the related RTP/RTCP content transmission related procedure. The benefit of a light-weight RTSP server protocol engine is, that "legacy" streaming player, which does not suppress the RTSP signalling and become confused, when there is no answer, can be used. In that case, the user plane negotiations (ports & IP Address) can be done via RTSP.

However these are merely examples showing that by means of additional information and exchanges according to the present invention a sharing of an ongoing data session might be realized.

The invention claimed is:

1. A method performed in a network integration node for sharing an ongoing streaming session between a first user and a group of at least one additional user, said method comprising:

participating, by the network integration node, in establishment of a one-to-one streaming session between the first user and a content server, wherein the content server streams the one-to-one streaming session via the network integration node to the first user;

performing, by the network integration node, a streaming session proxying procedure to track the one-to-one streaming session established between the first user and the content server, receiving, by the network integration node, a request from the first user for sharing the one-to-one streaming session with the group of at least one additional user after the one-to-one streaming session is ongoing between the first user and the content server, performing, by the network integration node, a conference establishment procedure to a conference node handling the group of at least one additional user for binding the network integration node to the conference node as a party of a conference by establishing a connection to the conference node, wherein the second performing step is initiated upon sending signalling to the conference node to trigger a conference invitation procedure for inviting the group of the at least one additional user, and performing, by the network integration node, a replication procedure for triggering a replication of the one-to-one streaming session by sending a copy of data packets received from the content server over the connection to the conference node, whereby the conference node upon receiving the data packets distributes the data packets to the group of at least one additional user.

2. The method according to claim 1 wherein the network integration node performs the replication of data packets of the one-to-one streaming session to the conference node and to the first user.

3. The method according to claim 2 wherein the network integration node during the replication creates a number of copies of the data packets to multiple destinations of which at least one is the conference node.

4. The method according to claim 1 wherein the network integration node replicates data packets of the one-to-one streaming session until said data packets reach the first user via the conference node.

5. The method according to claim 1 wherein the first user indicates in the request being sent to the network integration node a group identifier of the group of at least one additional user.

6. The method according to claim 5 wherein the request is an extension of a Radio Streaming Session Protocol, RTSP or http.

7. The method according to claim 1 wherein charging records for the first user and the additional users of the group of the at least one additional user are collected.

8. The method according to claim 1 wherein floor control function is implemented in at least one of the network integration node and in the conference node in order to allow the at least one additional user to control the streaming session instead of the first user.

9. The method according to claim 1, wherein the one-to-one streaming session is an audio and video streaming session.

10. The method according to claim 1, wherein the one-to-one streaming session is a unicast streaming session.

11. The method according to claim 1, wherein during the performing step the network integration node becomes a speaker and initiator of the shared streaming session.

12. A hardware-containing network integration node, in a telecommunication network, configured to perform a sharing of an ongoing one-to-one streaming session between a first user and a group of at least one additional user, said hardware-containing network integration node comprising:
  logic for participating in establishment of a streaming session between the first user and a content server, wherein the content server streams the one-to-one streaming session via the hardware-containing network integration node to the first user;
  proxy logic for proxying and tracking the one-to-one streaming session established between the content server to the first user,
  reception controller for receiving and evaluating a request received from the first user for sharing the ongoing one-to-one streaming session with the group of at least one additional user after the one-to-one streaming session is ongoing between the first user and the content server,
  binding controller for binding the network integration entity as a conference party to a conference node handling the group of the at least one additional user, wherein said binding controller is configured to establish a connection to the conference node upon sending signalling to the conference node to trigger a conference invitation procedure for inviting the group of the at least one additional user, and
  replication logic for triggering a replication of the one-to-one streaming session by sending a copy of data packets received from the content server over the connection to the conference node, whereby the conference node upon receiving the data packets distributes the data packets to the group of at least one additional user.

13. The hardware-containing network integration node according to claim 11 wherein the reception controller has a logic for evaluating a group identifier included in the request from the first user and wherein said group identifier is used in a communication with the conference node.

14. A system, in a telecommunication network, configured to perform a sharing of an ongoing one-to-one streaming session between a first user and a group of at least one additional user, wherein said system comprising:
  a hardware-containing network integration node comprising:
    logic for participating in establishment of a one-to-one streaming session between the first user and a content server, wherein the content server streams the streaming session via the hardware-containing network integration node to the first user;
    proxy logic for proxying and tracking the one-to-one streaming session established between the content server to the first user,
    reception controller for receiving and evaluating a request received from the first user for sharing the one-to-one streaming session with the group of at least one additional user after the one-to-one streaming session is ongoing between the first user and the content server,
    binding controller for binding the hardware-containing network integration entity as a conference party to a conference node handling the group of the at least one additional user, wherein said binding controller is configured to establish a connection to the conference node upon sending signalling to the conference node to trigger a conference invitation procedure for inviting the group of the at least one additional user, and
    replication logic for triggering a replication of the one-to-one streaming session by sending a copy of data packets received from the content server over the connection to the conference node, whereby the conference node upon receiving the data packets distributes the data packets to the group of at least one additional user.

15. A method performed in a network integration node and a conference node for sharing an ongoing streaming session between a first user and a group of at least one additional user, said method comprising:
  participating, by the network integration node, in establishment of a one-to-one streaming session between the first user and a content server, wherein the content server streams the streaming session via the network integration node to the first user;
  performing, by the network integration node, a streaming session proxying procedure to track the one-to-one streaming session established between the first user and the content server,
  receiving, by the network integration node, a request from the first user for sharing the one-to-one streaming session with the group of at least one additional user after the one-to-one streaming session is ongoing between the first user and the content server,
  performing, by the network integration node, a conference establishment procedure to a conference node handling the group of at least one additional user for binding the network integration node to the conference node as a party of a conference by establishing a connection to the conference node upon sending signalling to the conference node to trigger a conference invitation procedure for inviting the group of the at least one additional user, and
  performing, by the conference node, the replication of data packets of the one-to-one streaming session to the group of at least one additional user and also to the first user.

16. A system, in a telecommunication network, configured to perform a sharing of an ongoing streaming session between a first user and a group of at least one additional user, wherein said system comprising:
  a hardware-containing network integration node comprising:
    logic for participating in establishment of a one-to-one streaming session between the first user and a content server, wherein the content server streams the streaming session via the hardware-containing network integration node to the first user, proxy logic for proxying and tracking the one-to-one streaming session established between the content server to the first user, reception controller for receiving and evaluating a request received from the first user for sharing the one-to-one streaming session with the group of at least one additional user after the one-to-one streaming session is ongoing between the first user and the content server, binding controller for binding the network integration entity as a conference party to a hardware-containing conference node handling the group of the at least one additional user wherein said binding controller is is configured to establish a connection to the conference node upon sending signalling to the hardware-containing conference node to trigger a conference invitation procedure for inviting the group of the at least one additional user, and the hardware-containing conference node comprising:

replication logic for triggering a replication of data packets of the one-to-one streaming session to the group of at least one additional user and also to the first user.

\* \* \* \* \*